(12) United States Patent
Acquaviva

(10) Patent No.: US 8,495,490 B2
(45) Date of Patent: Jul. 23, 2013

(54) SYSTEMS AND METHODS OF SUMMARIZING DOCUMENTS FOR ARCHIVAL, RETRIVAL AND ANALYSIS

(75) Inventor: Paul Kevin Acquaviva, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 439 days.

(21) Appl. No.: 12/480,540

(22) Filed: Jun. 8, 2009

(65) Prior Publication Data

US 2010/0313118 A1    Dec. 9, 2010

(51) Int. Cl.
*G06F 7/00* (2006.01)
(52) U.S. Cl.
USPC .......................... 715/254; 715/243
(58) Field of Classification Search
USPC ................... 715/200, 243, 254, 255, 262
See application file for complete search history.

(56) References Cited

U.S. PATENT DOCUMENTS

| | | | | |
|---|---|---|---|---|
| 5,864,855 | A * | 1/1999 | Ruocco et al. | 1/1 |
| 7,349,980 | B1 * | 3/2008 | Darugar et al. | 709/238 |
| 7,788,403 | B2 * | 8/2010 | Darugar et al. | 709/238 |
| 2005/0114348 | A1 | 5/2005 | Wesinger, Jr. et al. | 707/10 |
| 2007/0078889 | A1 * | 4/2007 | Hoskinson | 707/102 |
| 2007/0248265 | A1 | 10/2007 | Lundstrom et al. | 382/168 |
| 2007/0255742 | A1 | 11/2007 | Perez et al. | 707/102 |
| 2008/0172371 | A1 | 7/2008 | Clark et al. | 707/5 |
| 2008/0231644 | A1 * | 9/2008 | Lempel et al. | 345/689 |
| 2008/0235218 | A1 * | 9/2008 | Jeffrey | 707/5 |
| 2008/0270462 | A1 * | 10/2008 | Thomsen | 707/103 R |
| 2008/0294794 | A1 * | 11/2008 | Darugar et al. | 709/238 |
| 2008/0319746 | A1 | 12/2008 | Okamoto et al. | 704/245 |
| 2009/0034851 | A1 * | 2/2009 | Fan et al. | 382/230 |
| 2009/0037355 | A1 * | 2/2009 | Brave et al. | 706/45 |
| 2009/0083677 | A1 * | 3/2009 | Darwish et al. | 715/854 |
| 2009/0171943 | A1 * | 7/2009 | Majumder et al. | 707/5 |

* cited by examiner

*Primary Examiner* — Stephen Hong
*Assistant Examiner* — Gregory J Vaughn
(74) *Attorney, Agent, or Firm* — Kermit D. Lopez; Luis M. Ortiz; Kevin Soules

(57) ABSTRACT

Systems and methods of summarizing documents for archival, retrieval, and analysis can be used to provide a convenient summary of the content of scanned document(s). After scanning a document or set of documents, character recognition software identifies the text on the pages. Software can produce a summary of the subjects/themes/keywords in the document(s). This summary can take several forms; e.g. an index of subjects/themes/keywords which can then be printed out as a cover sheet for that stack of documents. Alternately, the summary can be in the form of a topic cloud or histogram. The topic cloud can be made dynamic to allow a user to progressively scroll through pages of documents and watch the topic cloud evolve. The histogram can be made searchable to allow the user to view content of selected pages easily and conveniently.

17 Claims, 7 Drawing Sheets

SYSTEMS AND METHODS OF SUMMARIZING DOCUMENTS FOR ARCHIVAL, RETRIVAL AND ANALYSIS

The disclosed embodiments relate to methods and systems for archival, retrieval, and analysis of documents and, more specifically but not exclusively, to methods and systems of characterizing scanned documents.

BACKGROUND

Text document content characterization may be a component of document archival and retrieval systems. Multiple methods exist to both recognize text and analyze the thematic content of scanned text documents. This analysis is then used in a variety of ways for document archival, retrieval, and search mechanisms. A key to efficient archival and retrieval of documents is the manner in which the thematic content of those documents are displayed to the user of the system. This display must allow for the most precise identification of themes for optimal retrieval or efficient analysis. While a simple list of keywords or themes covered in a document(s) may be helpful, a conventional list lacks various capabilities and functionalities which would enable more efficient and precise analysis and retrieval.

There is a general need for document summarizing methods and systems that can facilitate optimal retrieval and efficient analysis of documents. It is believed that the methods and systems of the illustrative embodiments help meet this need.

SUMMARY

The following summary of the invention is provided to facilitate an understanding of some of the technical features related to techniques, apparatus, and methods and is not intended to be a full description. A full appreciation of the various aspects of the invention can be gained by taking the entire specification, claims, drawings, and abstract as a whole.

The aforementioned aspects of the invention and other objectives and advantages can now be achieved as described herein.

According to one aspect, a method of summarizing documents for archival, retrieval, and analysis is described. Scanned document analysis data including classification of at least one term used in at least one scanned document can be provided. A summary output can be generated from the analyzed scanned document data. A visualization of the summary output can be rendered. The summary output can be, for example, a hierarchal list, a topic cloud or a histogram. The summary output can be rendered on a display of a graphical user interface and/or printed on a substrate.

In one example, a topic cloud summary output can represent the frequency of usage of the term(s) used in the scanned document. The analysis data can include frequency of usage of the term(s) for each page of the document(s). For each of the pages, a topic cloud representing the frequency of usage of the term(s) used per page can be generated. A first topic cloud for a selected first page can be selected from the generated topic clouds in response to receiving a first clicking or scrolling signal representing selection of the first page. The first topic cloud can then be rendered on the graphical user interface. A second topic cloud for a selected second page can be selected from the generated topic clouds in response to receiving a second clicking or scrolling signal representing selection of the second page. Then the rendered first topic cloud can be updated to the second topic cloud.

This allows a dynamic topic cloud to be rendered on the GUI that changes with each page scrolled with keywords changing in font size or boldness depending on their frequency on that particular page. An operator scrolling through the documents can watch the topic cloud "evolve".

In yet another example provided, a scanned document analysis data can include frequency of usage of each one of a plurality of terms per page of the document(s). A searchable histogram electronic file for each respective term(s) of said plurality of terms can be generated. At least one term can be selected from said plurality of terms for viewing as a histogram. A corresponding searchable histogram for said selected term(s) can be selected from said generated plurality of searchable histograms. The selected searchable histogram has a first axis representing frequency of usage of the selected term(s) and a second axis representing page number of the document(s). The searchable histogram can be rendered on a graphical user interface. A first clicking or scrolling signal representing selection of a first page of the document(s) can be received. The searchable histogram and content of the selected first page can be rendered concurrently or sequentially on the graphical user interface in response to receiving the first clicking or scrolling signal. A second clicking or scrolling signal representing selection of a second page of the document(s) can be received. The searchable histogram and content of the selected second page can be rendered concurrently or sequentially on the graphical user interface in response to receiving the second clicking or scrolling signal.

If the individual documents in the stack are in a chronological order, the histogram provides the user with a quick visual overview of how the usage of a keyword or keywords changes throughout the stack of documents and thus through a time period. A user can quickly assess both the content of the document stack and the progression of the subject matter.

According to another aspect, a system for summarizing documents for archival, retrieval, and analysis is described. The system can comprise scanned document analysis data including classification of at least one term used in at least one scanned document, a controller configured to generate a summary output from the analyzed scanned document data, and render a visualization of the summary output.

According to yet another aspect, a computer program product comprising: a computer-usable data carrier storing instructions that, when executed by a computer, cause the computer to perform a method of summarizing documents for archival, retrieval, and analysis. The method can comprise providing scanned document analysis data including classification of at least one term used in at least one scanned document; generating a summary output from the analyzed scanned document data; and rendering a visualization of the summary output.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment of the present invention and are not intended to limit the scope of the invention.

Technical features described in this application can be used to construct various systems and methods of summarizing documents for archival, retrieval, and analysis. A combination of an existing digital scanner along with character recognition software can be used to provide a convenient summary of the content of the document(s) that are scanned. The user can begin by scanning a document or set of documents. After scanning, character recognition software identifies the text on the pages. Software can produce a summary of the subjects/themes/keywords in the document(s). This summary can take several forms; e.g. an index of subjects/themes/keywords which can then be printed out as a cover sheet for that stack of documents. Alternately, the summary can be in the form of a "topic cloud" with those subjects/themes/keywords, which are most frequently used displayed in a font that is larger or bolder or a different color than less frequent subjects/themes/keywords.

The summary can also be saved as a computer file which could then be used as a timesaving searchable index when attempting to retrieve a document or group of documents whose subject matter includes certain subjects/themes/keywords. Summary files for document groups can be mined as metadata and compared with other summary files to aid in document archival and retrieval. Topic clouds from multiple, separate scan, and analysis cycles could be interconnected via a computer application. As such, a user can select a topic listed and be directed to previously scanned and analyzed document(s) from a different group with the same subject/theme/keyword.

Figure 1:
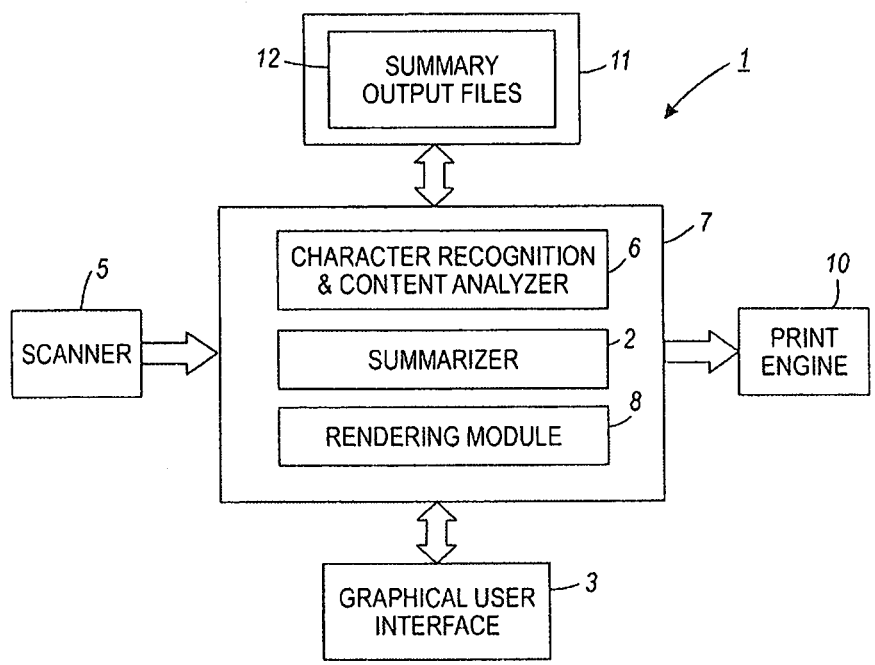
FIG. 1 illustrates a block diagram of a system of summarizing scanned documents for archival, retrieval, and analysis according to one embodiment.

Referring to the accompanying figures, FIG.1 is a block diagram of a system for summarizing documents according to one embodiment. System 1 includes a controller 7. Controller 7 is operably connected to a scanner 5, graphical user interface 3, and a database 11 of summary output files 12. Controller 7 includes a character recognition and content analyzer module 6, summarizer module 2, and rendering module 8. In the non-limiting example of FIG. 1, controller 7 is implemented on a computer which may be, for example, a desktop computer or hand held device. If necessary, controller 7 can be operably connected to a print engine 10 for printing the output summaries. Or, controller 7 (and GUI 3 and Scanner 5 and Print engine 10) can be implemented as a bundled feature in a reprographic machine common to businesses and home offices alike; i.e. multifunction printer/copier.

Scanner 5 can be any type of scanner configured to scan a document or set of documents into electronic files. Graphical user interface 3 can be any type of graphical user interface capable of displaying a rendered visualization of summary output files. Character recognition and content analyzer module 6, output summary file database 12, and rendering module 8 can be implemented in software, hardware and/or firmware. The modules can also be implemented on one or more computers. For example, character recognition and content analyzer 6 and summary output file database modules 12 can be implemented remotely on a proxy server or on one or more other servers operably connected to a proxy server and accessible by a local computer running the graphical user interface, summarizer, and rendering modules. Also, whilst in the illustrative embodiment, summary output files 12 are stored in database 11, other types of file storage systems can be used to store and allow retrieval of the summary outputs instead of a database. The aforementioned examples of implementing the modules are non-limiting and other types of implementations are envisaged.

An operating system runs on the computer(s) running the modules and may be a commercially available or open source operating system, such as (but not limited to) Apple, Windows, Unix, Linux or others not yet developed. Instructions for the operating system and applications or programs are stored in storage devices, such as a hard drive.

The method and systems of the illustrative embodiments provide a unique way of both displaying and using a summary analysis of a scanned document or group of scanned documents. A scanned document means a document of one or more pages of content that has been scanned into one or more electronic files by a scanner. A grouped of scanned documents means a group or stack of documents that have been scanned into one or more electronic files by a scanner. Each document of the group or stack of documents may contain one or more pages of content.

Figure 2:
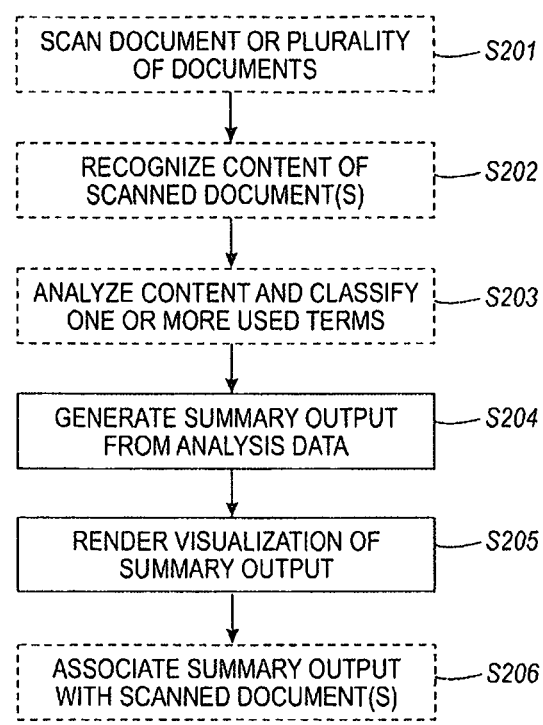
FIG. 2 illustrates a flow chart generally outlining a method of summarizing scanned documents for archival, retrieval, and analysis according to one embodiment.

FIG. 2 illustrates a flow chart outlining a method of characterizing documents for archival, retrieval, and analysis according to one embodiment.

Initially, one or a plurality of documents is scanned (s201). Typically, a stack of several documents is scanned as a unit, for example, because they are chronological or there is a common theme. Content of the scanned document or plurality of scanned documents is then recognized (s202). Recognized content is then analyzed and one or more terms used in the scanned document or plurality of documents is classified to provide analysis data for the scanned document or plurality of documents (s203). In the case of a plurality of documents, classification of one or more terms used can be determined for the total number of documents and/or per document or per page of the plurality of documents.

A summary output file or sheet can be generated from the analyzed scanned document or documents data (s204). The summary output file or sheet is produced for the user. It is unique to that document or group of documents. The summary output can include the classification of the one or more terms together with other document information such as the total number of document pages and document identification. As will be explained in more detail below, this summary sheet can be provided in several different formats. A visualization of the summary output file or sheet is then rendered (s205).

For example, in the system of FIG. 1, the summary output and, if necessary, the content of the scanned document or documents, can be visualized by rendering the summary output on a display of the graphical user interface 3 or on paper or other suitable substrate using print engine 10.

The summary output cover sheet or file can be associated with the document or plurality of documents it summarizes, for example, by linking, attaching or annexing the summary output file to the scanned document(s) (s206). In this manner, when a particular document or plurality of documents is selected or accessed, the summary output file is immediately available for use.

In the system of FIG. 1, the analyzed scanned document data is provided by a user scanning one or more documents into the controller 7 and then character recognition and analyzer module 6 recognizes content, letters, words, phrases, and analyzes the content of the scanned document or documents. In one embodiment, particular terms used in the document or documents are classified according to the frequency of usage in the document or documents. The analyzer can use a comparison and tabulation algorithm to determine the frequency of usage of one or more terms, identify keywords, phrases, themes, and subjects. However, system 1 need not necessarily include a scanner and recognition and analyzer module. For example, a method of summarizing documents for archival, retrieval, and analysis can be implemented in a system omitting the scanner and recognition and analyzer module by providing pre-analyzed scanned document data for the document(s) to the system rather than by implementing s201 and s202 of method FIG. 2. Documents could also be summarized for archival, retrieval, and analysis omitting the scanner if they were already in a digital format; i.e. word document file. These electronic format documents could then be subject to the recognition and analyzer module.

As already mentioned, the summary output file can take different formats. The summary output file can take the form of an electronic cover sheet file, a cover sheet print out, electronic histogram file and/or a searchable histogram. The cover sheet may be printed or saved as an electronic file in a .pdf, word, or similar format.

Figure 3:
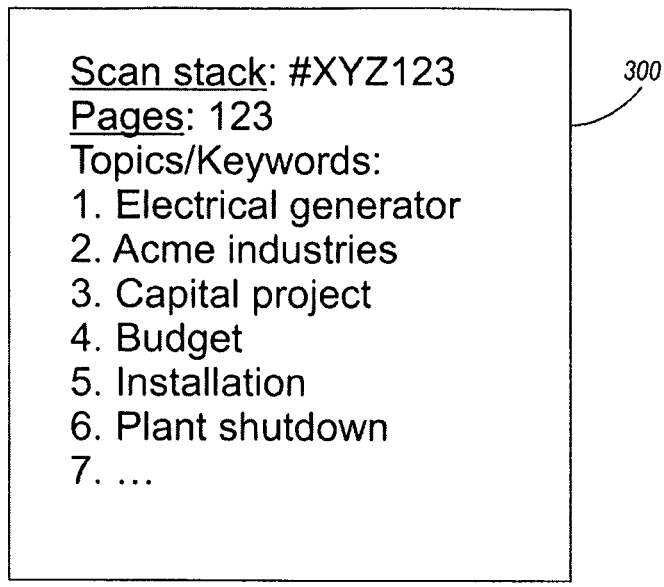
FIGS. 3 & 4 illustrate exemplary summary outputs rendered as a hierarchal list and topic cloud, respectively, according to embodiments.

In one embodiment, the summary output can be an electronic file or print out hierarchal list of most frequently detected keywords, phrases, or subjects. One non-limiting example of a topical list cover sheet printout 300 is depicted in FIG. 3.

Figure 4:
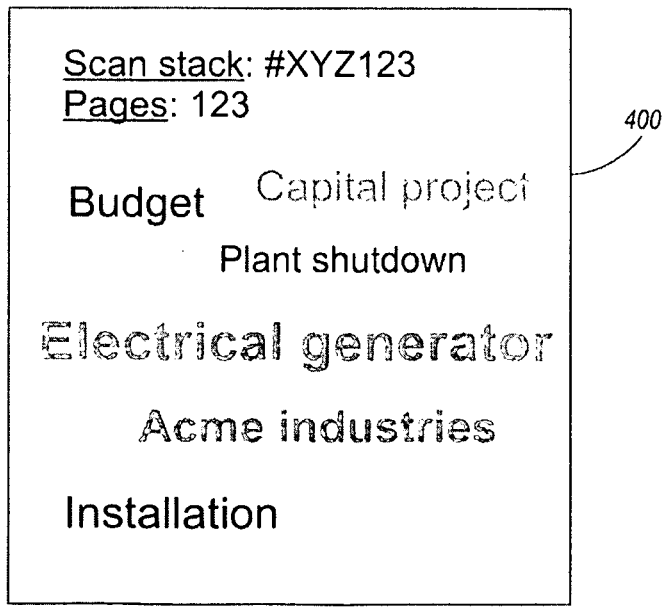

In an alternative embodiment, the summary could take the form of a topic cloud. A non-limiting example of a summary output rendered as a topic cloud cover page 400 is depicted in FIG. 4. A topic cloud is a visual weighted list of subjects, themes, or keywords. In a topic cloud, the font corresponding to the subjects, themes, or keywords increases in size, boldness, or color as the frequency with which those subjects, themes, or keywords appear in the document(s) increases. These topic clouds, also referred to as tag clouds, are standard features of many web logs and social networking sites on the internet. They provide numerous advantages over standard hierarchal lists.

For example, topic clouds visualize semantic information in a way which is superior to standard ordered lists of topics. A topic cloud immediately and intuitively communicates to the user which subjects are important without the user having to cognitively digest the information. A hierarchal list forces the user to scan the list in a fixed pattern (left to right, up then down, etc). Topic clouds, because of their non-uniform presentation structure, encourage quick scanning, facilitated by larger font or different colored or bolded words. Topic clouds communicate the relative frequency of subjects versus absolute frequency communicated by hierarchal lists. A thorough hierarchal list for a diverse document stack might contain several dozen subjects/keywords. As such, a user would need to review the contents of this list carefully in order to grasp the prominence of the concepts it includes. Topic clouds, when accessed via the controller, can be actionable for the user. The controller can enable the user to search or link to other stacks of documents, much like a hyperlink.

Consider as an example a topic cloud created for a document stack. The topic cloud is presented to the user on the GUI. The operator can then click, or select, a particular keyword in the topic cloud. As an example, the operator can select the most frequently used keyword or term in the topic cloud (i.e. the boldest or largest font term). A database of other topic clouds for other scanned documents or document stacks is accessed and other topic clouds with the same most frequently used keyword or term can be presented to the operator. As these topic clouds represent summaries of documents or document stacks, in this way the operator is able to navigate quickly and efficiently to other similar themed document stacks.

Figure 5:
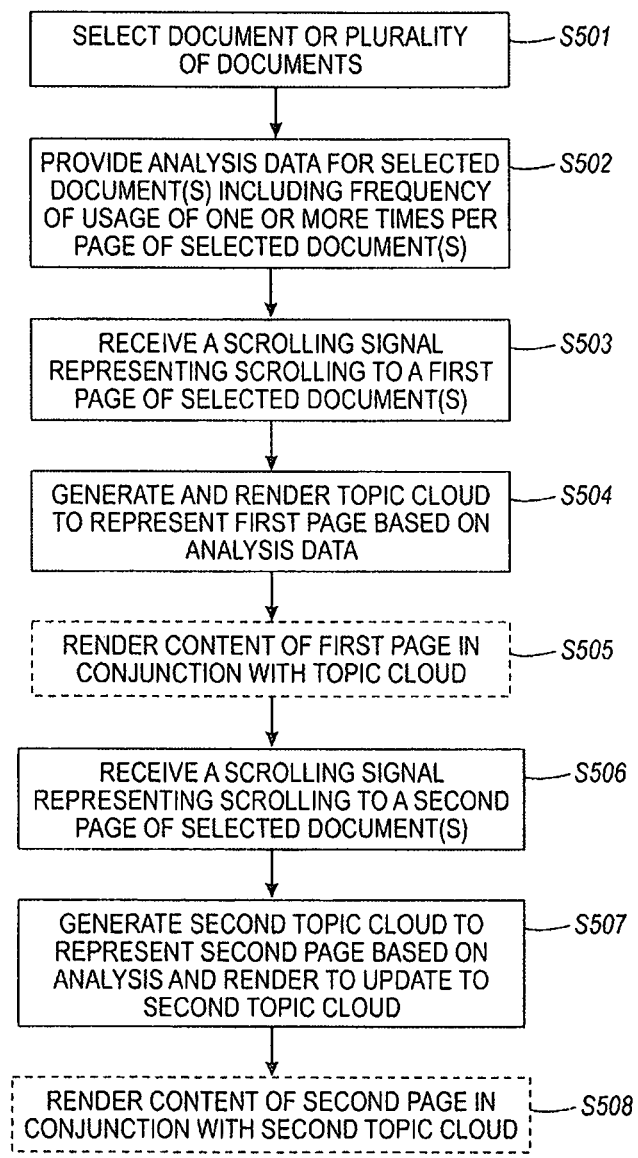
FIG. 5 illustrates a flow chart outlining a method of summarizing scanned documents for archival, retrieval, and analysis in which the output summary is a topic cloud according to one embodiment.

FIG. 5 illustrates a flow chart outlining a method of summarizing documents for archival, retrieval, and analysis according to another embodiment.

One or more summary outputs associated with a plurality or stack of documents can be selected (s501). For example, in FIG. 1 a user can select the plurality of documents by operating the graphical user interface. Scanned document analysis data for the selected document or documents is then provided (s502). For example, in the system of FIG. 1, the provided analysis data is a dynamic topic cloud summary output file generated for the entire plurality of documents or document stack. However, in an alternative embodiment, the provided analysis data can be more than one summary output file 12 associated with the selected plurality of documents. The dynamic topic cloud summary output file can be provided in the database 11 and can contain a topic cloud generated for each page of the document or document stack. Each topic cloud represents the frequency of usage of different terms for a particular page of the stack or plurality of documents. For example, the frequency of usage of different terms per page can be subjects/themes/keywords which are most frequently used and subjects/themes/keywords which are less frequently used in each page of the document stack. In response to receiving a clicking or scrolling signal representing selection of a first page of the document or document stack by a user clicking or scrolling on a visual icon/indicator of a graphical user interface display (s503), a topic cloud is generated and rendered for that page based on the provided analysis data (s504). For example, in the system of FIG. 1, a user operating the graphical user interface of system 1 can use a scrolling device, such as a mouse or on-screen scroll button or buttons, to scroll an icon on the display to select the first page of the document or document stack and the system, in response, can access the dynamic topic cloud summary stored in the database and retrieve the corresponding topic cloud for the selected first page to generate and render the first topic cloud on the graphical user interface. Optionally, the content of the selected first page can also be retrieved and displayed in conjunction with the first topic cloud (s505). For example, the system 1 can also retrieve from the database the content of the selected first page in response to first page being selected. The selected first page content and first topic cloud associated therewith can be rendered on separate portions of the display or could be sequentially rendered one after the other.

In response to receiving a scrolling signal representing selection of a second page of the document or document stack by a user clicking or scrolling a visual icon/indicator on the graphical user interface (s506), a second topic cloud representing said selected second page is generated based on the provided analysis data and rendered on the graphical user interface to thereby update the first topic cloud to the second topic cloud (s507). This would be achieved in the example system of FIG. 1 by the user operating the mouse scroll device further to scroll the icon on the display to select the second page. The system, in response, accesses the dynamic topic cloud summary output file in the database and retrieves the corresponding topic cloud for the second page to generate and renders the first topic cloud on the graphical user interface. Further processes can be implemented (not shown) similar to s506-s508 for each further page selected by the scrolling device.

In this manner, a dynamic topic cloud is rendered on the GUI that would change with each page scrolled, with keywords changing in font size or boldness depending on their frequency on that particular page. An operator scrolling through the documents can watch the topic cloud "evolve".

Figure 6:
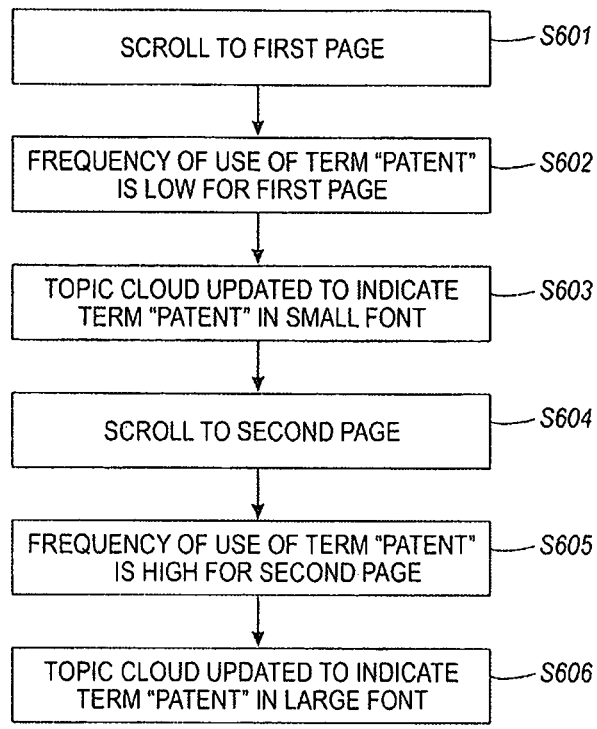
FIG. 6 illustrates a flow chart illustrating the process of updating a topic cloud to reflect prevalence of a term in the document stack.

The method of FIG. 5 can allow the operator to view how a keyword or phrase waxes or wanes (via font, color, or boldness) according to its prevalence in a stack of documents as the operator scrolls through the stack of documents. Consider the simple non-limiting example in which a dynamic topic cloud is generated for a document or stack of documents and in which the frequency of use of the term "patent" in the first page of the document(s) is low and in the second page is high. FIG. 6 is a flow chart illustrating how the dynamic topic cloud is updated to reflect the prevalence of the term "patent" in the document stack. The user scrolls to a first page of a plurality of documents (s601). The topic cloud summary output for the first page reflects the frequency of use of the term "patent" is low for the first page (s602). The topic cloud is updated on the display to indicate the term "patent" in small font (s603). The user scrolls to a second document (s604). The summary output reflects the frequency use of the term "patent" in the second document is high (s605). The topic cloud is updated on the display to indicate the term "patent" in large font (s606). Consequently, as the user scrolls from the first page to the second page of the document(s), the term "patent" represented in the topic cloud changes from small font to large font corresponding to the change of frequency of use of the term "patent" changing from low for the first page to high for the second page. The plurality of documents can contain n many documents and the user can scroll through each, or only selected n documents to display corresponding topic clouds to thereby provide an evolving dynamic topic cloud to reflect changes in frequency of use of the term "patent". The process of FIG. 6 is implemented for each other term of the topic cloud so that the topic cloud would be updated to respectively show the prevalence of each topic or term as the user scrolls through the documents.

Figure 8:
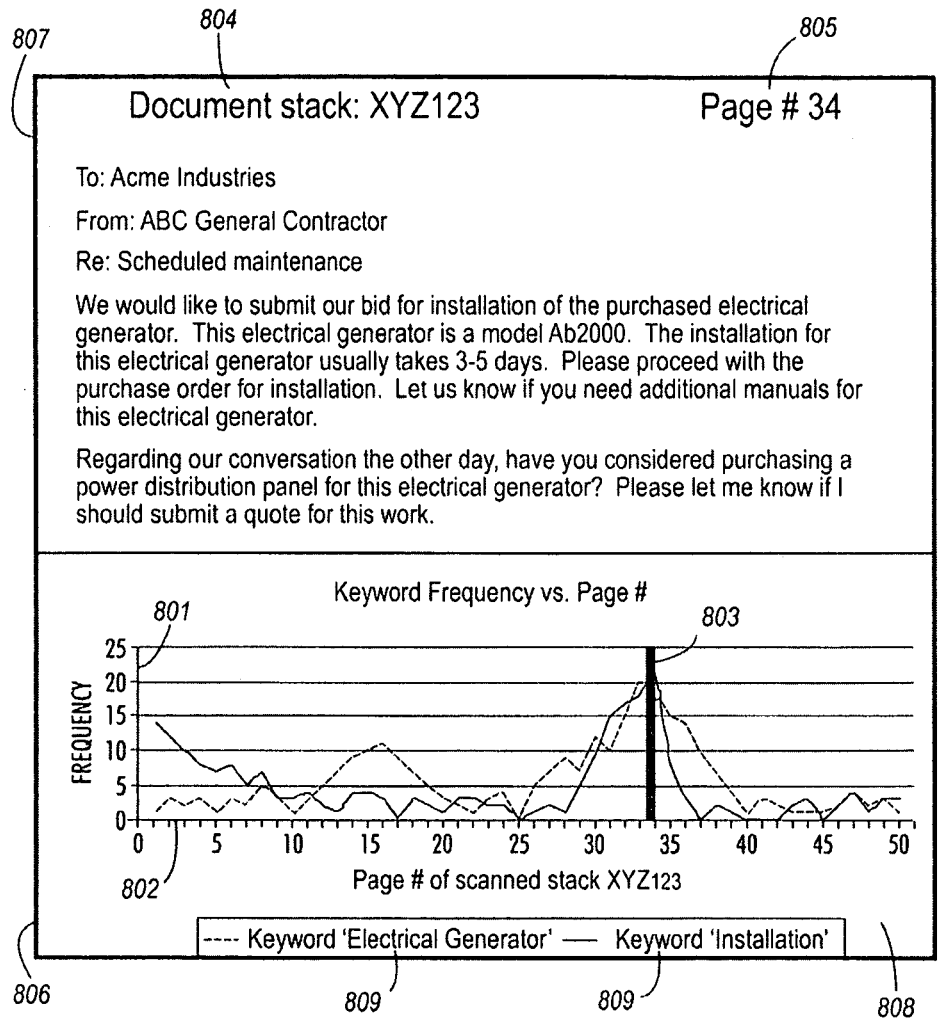
FIG. 8 illustrates an example of a histogram rendered on a computer display.

In yet another embodiment, the summary output may be in the form of a histogram or other topography file for rendering a histogram representing frequency of usage of one or more selected terms versus document. A topography map can be generated and rendered on the display to show how the prevalence of a selected term, such as a keyword or phrase, changes throughout a stack of documents. One non-limiting example of such a histogram 808 is depicted in FIG. 8.

Respective scanned pages are shown in the top half 807 of the screen of a graphical user interface. Document stack identification 804 and document stack page number 805 are also displayed in the screen top half 807 with the respective scanned page. The histogram 808 is rendered on the screen lower half 806. The frequency with which one or more keywords, or other terms 809 are referenced, are presented on the y-axis 801 and the progression through the document stack would be represented by the x-axis 802. A cursor bar 803 effects scroll through the document stack. In the example of FIG. 8, the cursor bar is placed at the confluence of peak frequency of selected keywords "Electrical generator" and "Installation".

Thus, the operator wouldn't need to scroll through the document stack to see where the reference to a particular keyword peaked, for example. A user could also select more than one subject and then use the application to search the document for a confluence of those subjects. These applications provide an additional advantage over hierarchal lists in that they allow the content of the document stack to be visible in the application while still providing analysis of keyword, subject, and theme data.

Optionally, scanned document content can be rendered on the display or screen in conjunction with the histogram. For example, a user can view the scanned documents in a portion of the display, such as the top portion of the computer screen (see for example FIG. 8). Another portion of the display, such as the bottom portion of the computer screen, displays the histogram graph. The x-axis of the histogram represents the page or document number of the stack of scanned documents. The y-axis of the graph would represent the frequency of a term or terms, such as keyword(s) or topic(s).

Figure 7:
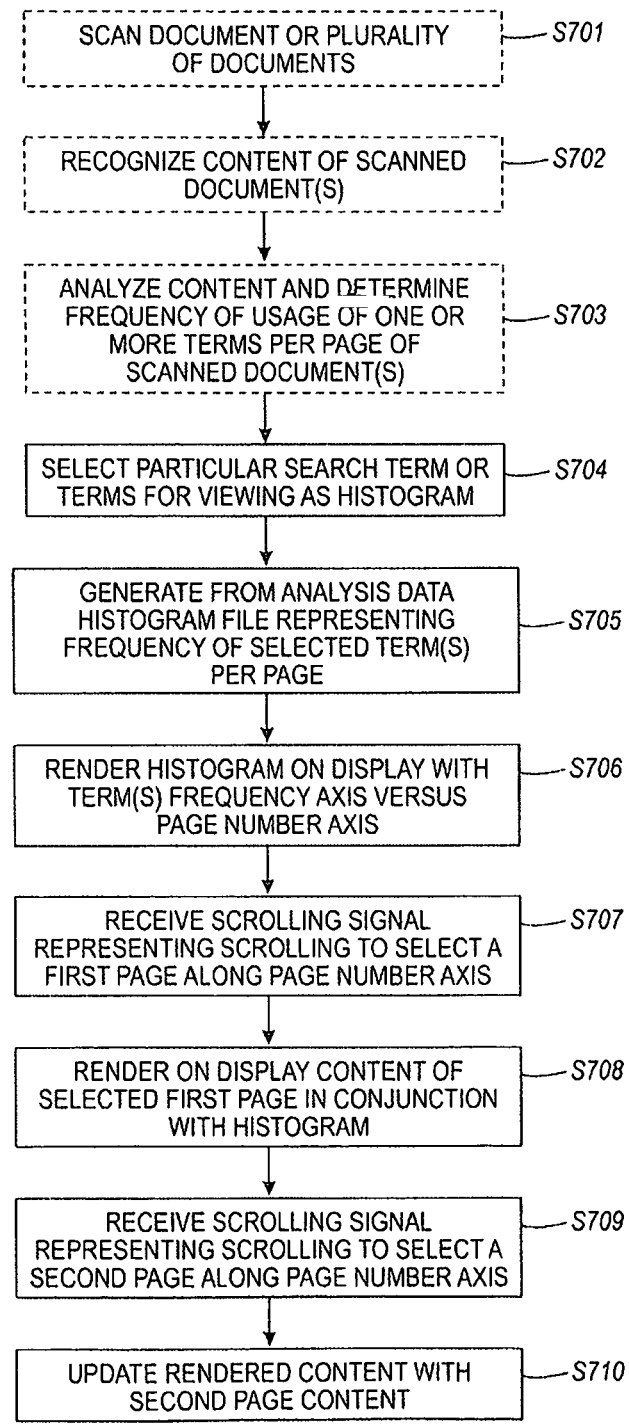
FIG. 7 illustrates a flow chart outlining a method of summarizing documents for archival, retrieval, and analysis according to an embodiment in which the output summary file format is a searchable histogram format.

FIG. 7 illustrates a flow chart outlining a method of summarizing documents for archival, retrieval, and analysis according to an embodiment in which the output summary file format is a histogram format. One or a plurality of documents is scanned (s701). Content of the scanned document or plurality of documents is then recognized (s702). Recognized content is then analyzed and frequency of usage of one or more terms is determined to provide analysis data for the scanned document or plurality of documents (s703). Scanned analysis data including frequency of usage of one or more terms is provided. In the case of a plurality of documents, the frequency of usage can be determined by page of the plurality of documents.

The summary output used in this method is in the form of the histogram file which includes frequency of usage of different terms per document of the plurality of documents.

For example, the frequency of usage of different terms per page can be subjects/themes/keywords which are most frequently used and subjects/themes/keywords which are less frequently used in each document of the document stack. First, document(s) are scanned s701. Typically, a stack of several documents is scanned as a unit, for example, because they are chronological or there is a common theme. The content of the scanned documents is recognized s702. Then the content is analyzed and frequency of terms is determined s703. In the system of FIG. 1, this results in a database 11 of terms and term frequency. One or a combination of terms is then selected for viewing as a histogram (s704). The selection of terms can be accomplished in several ways. Choices could be presented to the user or the user can enter a term into the GUI. For choices presented to the user, the choices are presented in the form of the hierarchical list in which the operator then selects the term or terms. Alternately, the choices presented to the user can be in the form of the topic cloud, in which the operator would select the term from the topic cloud.

Upon selection of the term(s), the histogram file or sheet for the selected term(s) is generated s705 from the data collected in s703. The histogram file or sheet is produced for the user, unique to that document or group of documents and the keywords selected. A histogram representing term frequency on one axis and page numbers on the other axis is rendered on the display for particular selected term or terms s706. One non-limiting example of a histogram rendered on a display is depicted in FIG. 8. The histogram includes a visual icon or indicator which can be manipulated by a user, for example, by clicking or scrolling the icon such as scroll bar, to select particular document page numbers on the document axis (x-axis in FIG. 8). In response to the system receiving a scrolling or clicking signal representing selection of a first page on the document axis by a user scrolling or clicking a visual icon/indicator of a graphical interface (s707), content of the selected first document is rendered on the display in conjunction with histogram (s708). In the example of FIG. 8, the content of the selected first page (page number 34) is displayed in the top portion of the display screen in response to the system receiving a signal as a result of the user scrolling the cursor bar 803 to select document page number 34 (see FIG. 8). In response to the system receiving a scrolling or clicking signal representing selection of a second page on the document axis by a user scrolling or clicking a visual icon/indicator of a graphical interface (s709), content of the selected second page is rendered on the display in conjunction with histogram to thereby update the rendered page content to the second page content (s710). The rendered updated second page content is not shown in FIG. 8. Further process steps similar to s709 and s710 can be implemented for next page numbers, for example, by scrolling to progressively select subsequent page numbers on the document axis and cause corresponding page content to be updated on the display (not shown in FIG. 8).

In the system of FIG. 1, the method of FIG. 7 allows the user to select a keyword or confluence of keywords, and a scroll bar would be moved with a mouse across the histogram to locate the peak frequency of those keywords in that particular document stack (see FIG. 8). As the scroll bar is moved by the user through the histogram, the corresponding scanned document content in the top portion of the screen will progress through the pages or documents of the document stack. In this way, the user is able to remain within the content of the documents while utilizing the assisted search. This is an advantage over existing document search functions which require the user to leave the content to perform search functions. rendered (s205).

If the individual documents in the stack are in a chronological order, the histogram provides the user with a quick visual overview of how the usage of a keyword or keywords changes throughout the stack of documents and thus through a time period. With this tool, a user can quickly assess both the content of the document stack and the progression of the subject matter.

Alternately, the summary could be saved as a computer data file. These computer data files then represent metadata which could be compared amongst or between each other for patterns, or could be used as a searchable database themselves, which would aid in document archival and retrieval. For example, if a user had a database of histograms for multiple document stacks, the user could use the histogram database to look for collections of document stacks that make frequent reference to selected keywords or terms. In this manner, it would aid in document stack selection and retrieval. In another example, the histograms of frequently used keywords or terms for multiple document stacks could be compared against each other to identify common trends in keyword usage throughout a document stack. It could be speculated that document stacks with similar histogram trends for the same term or keyword indicate a correlation in topic or chronology.

It will be appreciated that several of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The claims, as originally presented and as possibly amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method comprising:
providing scanned document analysis data including classification of at least one of a term, a subject, and a theme used in a plurality of scanned documents;
generating a summary output from said analyzed scanned document data;
rendering a visualization of said summary output;
saving said summary output as metadata;
mining said metadata for comparison with other summary output for archiving and retrieving said plurality of scanned documents according to said summary output;
providing scanned document analysis data including frequency of usage of each one of a plurality of terms per page of said document(s);
generating a searchable histogram electronic file for each respective term(s) of said plurality of terms;
selecting at least one term from said plurality of terms for viewing as a histogram;
selecting a particular searchable histogram for said selected term(s) from said generated plurality of searchable histograms;
said selected searchable histogram having a first axis representing frequency of usage of said selected term(s) and a second axis representing page number of said document(s);
rendering said searchable histogram on a graphical user interface, receiving a first clicking or scrolling signal representing selection of a first page of said document(s) by a user clicking or scrolling a visual icon/indicator on said graphical user interface;
rendering concurrently or sequentially on said graphical user interface said searchable histogram and content of said selected first page in response to receiving said first clicking or scrolling signal;
receiving a second clicking or scrolling signal representing selection of a second page of said document(s) by a user clicking or scrolling a visual icon/indicator on said graphical user interface; and
rendering concurrently or sequentially on said graphical user interface said searchable histogram and content of said second page in response to receiving said second clicking or scrolling signal.

2. The method of claim 1, wherein generating a summary output comprises generating a summary output electronic file comprising a hierarchal list of said term(s), said subject(s), and said theme(s) used in said scanned document(s).

3. The method of claim 1, wherein providing scanned document analysis data including classification of at least one of a term, a subject, and a theme used in at least one scanned document comprises providing scanned document analysis data including frequency of usage of said term(s), said subject(s), and said theme(s) used in said scanned document(s) and wherein generating a summary output comprises generating a summary output electronic file or sheet comprising a topic cloud representing the frequency of usage of said terms(s), said subject(s), and said theme(s) used in said scanned document(s).

4. The method of claim 3, wherein said analysis data includes frequency of usage of said term(s), said subject(s), and said theme(s) for each page of said document(s); the method further comprising generating, for each of said pages a topic cloud representing the frequency of usage of said terms(s), said subject(s), and said theme(s) used per page; receiving a first clicking or scrolling signal representing selection of a first page of said document(s) by a user clicking or scrolling a visual icon/indicator of a graphical user interface; selecting a first topic cloud for said selected first page from said generated topic clouds in response to receiving said first clicking or scrolling signal, rendering on said graphical user interface said first topic cloud; receiving a second clicking or scrolling signal representing selection of a second page of said document(s) by a user clicking or scrolling a visual icon/indicator of said graphical user interface; selecting a second topic cloud for said selected second page from said generated topic clouds in response to receiving said second clicking or scrolling signal; and updating said rendered first topic cloud to said second topic cloud.

5. The method of claim 4, further comprising rendering concurrently on said graphical user interface said first topic cloud and content of said selected first page; and rendering concurrently on said graphical user interface said second topic cloud and content of said second selected page.

6. The method of claim 1, wherein generating a summary output comprises generating a histogram electronic file or sheet representing the frequency of usage of said terms(s), said subject(s), and said theme(s) used in said scanned document(s) versus the document number or page.

7. The method of claim 1, wherein rendering said searchable histogram on said graphical user interface includes rendering a scroll bar on said graphical user interface, and further comprising generating said first clicking or scrolling signal in response to scrolling said scroll bar along the page number axis of said histogram to select said first page and further comprising generating said second clicking or in response to scrolling said scroll bar along the page number axis of said histogram to select said second page.

8. The method of claim 1, further comprising providing scanned document analysis data for each stack of a plurality of scanned document stacks; each of said scanned document stacks comprising at least one document; wherein said scanned analysis data, for each document stack, includes frequency of usage of at least one term; and further comprising generating output summaries for each document stack from said scanned document analysis data, searching and determining among said generated output summaries for at least one output summary that makes frequent reference to at least one selected term; retrieving said document stack(s) associated with said determined at least one output summary.

9. The method of claim 1, further comprising providing scanned document analysis data for each of a plurality of document stacks; each of said stacks of scanned documents comprising at least one document; wherein said scanned analysis data, for each document stack, includes frequency of usage of at least one term per page; and further comprising generating histogram output summaries for each document stack from said scanned document analysis data, each of said histograms output summaries representing frequency of usage of at least one term per page; selecting at least one particular term, determining from among said generated histogram output summaries document stacks that make frequent reference to said selected term(s); rendering histograms for said determined respective document stacks; and comparing said rendered histograms against each other for identifying trends in the selected term usage in each document stack.

10. A system comprising:
an analyzer module embodied as non-transitory instruction media residing in a computer wherein, scanned document analysis data including classification of at least one of a term, a subject, and a theme used in a plurality of scanned documents are provided;
a controller embodied as non-transitory instruction media residing in a computer, configured to generate a summary output from said analyzed scanned document data; and
a rendering module embodied as non-transitory instruction media residing in a computer for rendering a visualization of said summary output, and saving said summary output as metadata, wherein said system is configured for mining said metadata for comparison with other summary output for archiving and retrieving said plurality of scanned documents according to said summary output;
wherein said scanned document analysis data includes frequency of usage of each one of a plurality of terms per page of said document(s);
wherein said controller embodied as non-transitory instruction media residing in a computer is operably connected to a graphical user interface and further configured to:
generate a searchable histogram electronic file for each respective term(s) of said plurality of terms;
select at least one term from said plurality of terms for viewing as a histogram;
select a particular searchable histogram for said selected term(s) from said generated plurality of searchable histograms;
said searchable histogram having a first axis representing frequency of usage of said selected term(s) used in said scanned documents(s) and a second axis representing page number;
render said selected particular searchable histogram on said graphical user interface, receive a first clicking or scrolling signal representing selection of a first page of said document(s) by a user clicking or scrolling a visual icon/indicator on said graphical user interface;
render concurrently or sequentially on said graphical user interface said searchable histogram and content of said selected first page in response to receiving said first clicking or scrolling signal;
receive a second clicking or scrolling signal representing selection of a second page of said document(s) by a user clicking or scrolling a visual icon/indicator on said graphical user interface; and
render concurrently or sequentially on said graphical user interface said searchable histogram and content of said second page.

11. A system of claim 10 wherein said summary output comprises a summary output electronic file comprising a hierarchal list, topic cloud or histogram of said term(s), said subject(s), and said theme(s) used in said scanned document(s).

12. A system of claim 10, wherein said scanned document analysis data includes frequency of usage of said term(s), said subject(s), and said theme(s) used in said scanned document(s) and wherein said summary output comprises a summary output electronic file or sheet comprising a topic cloud representing the frequency of usage of said terms(s), said subject(s), and said theme(s) used in at least one selected scanned document.

13. A system of claim 12, wherein said scanned document analysis data includes frequency of usage of said term(s), said subject(s), and said theme(s) for each page of said document(s); and further comprising a graphical user interface operably connected to said controller embodied as non-transitory instruction media residing in a computer and wherein said controller embodied as non-transitory instruction media residing in a computer is further configured to: generate, for each of said pages, a topic cloud representing the frequency of usage of said terms(s), said subject(s), and said theme(s) used per page; receive a first clicking or scrolling signal representing selection of a first page of said document(s) by a user clicking or scrolling a visual icon/indicator of a graphical user interface; select a corresponding first topic cloud for said selected first page from said generated topic cloud in response to receiving said first clicking or scrolling signal; render on said graphical user interface said first topic cloud; receive a second clicking or scrolling signal representing selection of a second page of said document(s) by a user clicking or scrolling a visual icon/indicator of said graphical user interface; select a corresponding second topic cloud for said selected second page from said generated topic cloud in response to receiving said second clicking or scrolling signal; and update said rendered first topic cloud to said second topic cloud.

14. The system of claim 10, further comprising scanned document analysis data for each stack of a plurality of document stacks; each of said stacks of scanned documents comprising at least one document, wherein said scanned document analysis data includes, for each document stack, frequency of usage of at least one term per page; and wherein said controller embodied as non-transitory instruction media residing in a computer is configured to generate, for each document stack, a respective summary output, each of said generated summary outputs comprising a computer data file including metadata representing frequency of usage of at least one term per page; and wherein said controller embodied as non-transitory instruction media residing in a computer is configured to compare amongst or between said generated summary outputs for patterns and/or search said generated summary outputs.

15. A non-transitory computer program product comprising: a computer-usable data carrier storing instructions that, when executed by a computer, cause the computer to perform a method comprising:

providing scanned document analysis data including classification of at least one of a term, a subject, and a theme used in at least one scanned document;

generating a summary output from said analyzed scanned document data;

rendering a visualization of said summary output; saving said summary output as metadata; mining said metadata for comparison with other summary output for archiving and retrieving said at least one scanned document according to said summary output;

providing scanned document analysis data including frequency of usage of each one of a plurality of terms per page of said document(s);

generating a searchable histogram electronic file for each respective term(s) of said plurality of terms;

selecting at least one term from said plurality of terms for viewing as a histogram;

selecting a particular searchable histogram for said selected term(s) from said generated plurality of searchable histograms;

said selected searchable histogram having a first axis representing frequency of usage of said selected term(s) and a second axis representing page number of said document(s);

rendering said searchable histogram on a graphical user interface, receiving a clicking or scrolling signal representing selection of a first page of said plurality of documents by a user clicking or scrolling a visual icon/indicator on said graphical user interface;

rendering on said graphical user interface content of said selected first page in conjunction with or sequentially with said searchable histogram;

subsequently receiving a clicking or scrolling signal representing selection of a second page of said plurality of documents by a user clicking or scrolling a visual icon/indicator on said graphical user interface; and rendering on said graphical user interface content of said second page in conjunction with or sequentially with said searchable histogram.

16. The computer program product of claim 15, wherein providing scanned document analysis data including classification of at least one term used in at least one scanned document comprises providing scanned document analysis data including frequency of usage of said term(s), said subject(s), and said theme(s) used in said scanned document(s) and wherein generating a summary output comprises generating a summary output electronic file comprising a topic cloud representing the frequency of usage of said terms(s), said subject(s), and said theme(s) used in at least one selected scanned document.

17. The computer program product of claim 16, wherein said analysis data includes frequency of usage of said term(s), said subject(s), and said theme(s) for each page of said document(s); the method further comprising generating, for each of said pages, a topic cloud representing the frequency of usage of said terms(s), said subject(s), and said theme(s) used per page; receiving a clicking or scrolling signal representing selection of a first page of said document(s) by a user clicking or scrolling a visual icon/indicator of a graphical user interface; selecting a first topic cloud for said selected first page from said generated topic clouds, rendering on said graphical user interface said first topic cloud; receiving a clicking or scrolling signal representing selection of a second page of said document(s) by a user clicking or scrolling a visual icon/indicator of said graphical user interface; selecting a second topic cloud for said selected second page from said generated topic clouds, and updating said rendered first topic cloud to said second topic cloud.

* * * * *